United States Patent
Kunimitsu (10) Patent No.: US 11,588,185 B2
(45) Date of Patent: Feb. 21, 2023

(54) MANAGEMENT DEVICE AND POWER SUPPLY SYSTEM

(71) Applicant: SANYO Electric Co., Ltd., Daito (JP)

(72) Inventor: Tomonori Kunimitsu, Hyogo (JP)

(73) Assignee: SANYO Electric Co., Ltd., Daito (JP)

(*) Notice: Subject to any disclaimer, the term of this patent is extended or adjusted under 35 U.S.C. 154(b) by 323 days.

(21) Appl. No.: 16/954,389

(22) PCT Filed: Nov. 15, 2018

(86) PCT No.: PCT/JP2018/042205
§ 371 (c)(1),
(2) Date: Jun. 16, 2020

(87) PCT Pub. No.: WO2019/123906
PCT Pub. Date: Jun. 27, 2019

(65) Prior Publication Data
US 2021/0083331 A1    Mar. 18, 2021

(30) Foreign Application Priority Data
Dec. 19, 2017   (JP) .............................. JP2017-243128

(51) Int. Cl.
*H01M 10/46* (2006.01)
*H01M 10/42* (2006.01)
*H02J 7/00* (2006.01)

(52) U.S. Cl.
CPC ... *H01M 10/4207* (2013.01); *H01M 10/4257* (2013.01); *H02J 7/0016* (2013.01); *H02J 7/0019* (2013.01); *H01M 2010/4271* (2013.01)

(58) Field of Classification Search
CPC ...... H02J 7/0014; H02J 7/0016; H02J 7/0019; H02J 7/0048; H02J 7/005; H01M 10/4207; H01M 10/4257; H01M 2010/4271
(Continued)

(56) References Cited

U.S. PATENT DOCUMENTS

| | | | |
|---|---|---|---|
| 2012/0274283 A1* | 11/2012 | van Lammeren | H02J 7/0016 320/118 |
| 2015/0236534 A1 | 8/2015 | Kim et al. | |
| 2016/0190828 A1 | 6/2016 | Nakamura et al. | |

FOREIGN PATENT DOCUMENTS

| | | |
|---|---|---|
| EP | 2 372 865 A2 | 10/2011 |
| EP | 2 518 860 A1 | 10/2012 |

(Continued)

OTHER PUBLICATIONS

Extended (Supplementary) European Search Report dated Nov. 4, 2020 issued in counterpart EP Application No. 18889980.1. (6 pages).

(Continued)

*Primary Examiner* — Edward Tso
(74) *Attorney, Agent, or Firm* — WHDA, LLP (57) ABSTRACT

A plurality of power source circuits is each configured to be able to selectively charge any one of a plurality of cells included in each of series cell groups by using a voltage across each of series cell groups. The plurality of discharge circuits are each configured to be able to discharge a capacity stored in each of series cell groups. A controlling circuit equalizes the states of the plurality of cells included in each of the series cell groups by using the plurality of power source circuits. The controlling circuit equalizes the states of the plurality of series cell groups by using the plurality of discharge circuits.

4 Claims, 4 Drawing Sheets

(58) Field of Classification Search
USPC .......................... 320/116, 117, 118, 132, 148
See application file for complete search history.

(56) References Cited

FOREIGN PATENT DOCUMENTS

| | | |
|---|---|---|
| JP | 2007-300701 A | 11/2007 |
| JP | 2010-142039 A | 6/2010 |
| JP | 2013-223378 A | 10/2013 |
| JP | 2015-15777 A | 1/2015 |
| WO | 2013/157576 A1 | 10/2013 |
| WO | 2017/178023 A1 | 10/2017 |

OTHER PUBLICATIONS

International Search Report dated Dec. 18, 2018, issued in counterpart application No. PCT/JP2018/042205, with English translation. (4 pages).

* cited by examiner

MANAGEMENT DEVICE AND POWER SUPPLY SYSTEM

TECHNICAL FIELD

The present invention relates to a management device that manages the state of a power storage unit and a power supply system.

BACKGROUND ART

In recent years, hybrid vehicles (HV), plug-in hybrid vehicles (PHV), and electric vehicles (EV) have become popular. These cars are equipped with secondary batteries as key devices. Nickel-metal hydride batteries and lithium-ion batteries are widely used as automotive secondary batteries. Lithium-ion batteries with a high energy density are expected to become more widely used in the future.

Lithium-ion batteries require stricter voltage control than other types of batteries because the normal range is close to the no-use range. Generally, in a lithium-ion battery, an equalizing process for equalizing voltages among a plurality of cells connected in series is performed from the viewpoint of maintaining power efficiency and ensuring safety (e.g., see PTL 1).

A passive method is a mainstream for the equalizing process. In the passive method, discharge resistors are connected to a plurality of cells connected in serial, respectively, and the cells other than the lowest-voltage cell are discharged so as to match the voltages of the other cells with the voltage of the lowest-voltage cell.

As another method of the equalizing process, there is an active method. In the active method, a charging circuit is provided, and among a plurality of cells connected in series, the cells other than the highest-voltage cell are charged so as to match the voltages of the other cells with the voltage of the highest-voltage cell.

CITATION LIST

Patent Literature

PTL 1: Unexamined Japanese Patent Publication No. 2013-223378

SUMMARY OF THE INVENTION

In the passive method, a part of the energy stored in the cell needs to be discarded for equalization, and the power efficiency is lowered. Heat is generated when a current flows through the discharge resistor. On the other hand, in the active method, since a charging circuit for charging each cell is required, the component configuration is complicated and the cost is increased.

The present invention is made in view of the above situation, and an object of the present invention is to provide a technique for improving power efficiency while preventing the complication of a component configuration in a process of equalization among a plurality of cells connected in series.

In order to solve the above problems, a management device according to an aspect of the present invention is a management device provided with: a plurality of power source circuits connected respectively to a plurality of series cell groups each including a plurality of cells connected in series, the plurality of power source circuits each being configured to be able to selectively charge any one of the plurality of cells included in each of the series cell groups by using a voltage across each of the plurality of series cell groups; a plurality of discharge circuits connected respectively to the plurality of series cell groups, the plurality of discharge circuits each being configured to be able to discharge a capacity stored in each of the plurality of series cell groups; a voltage detection circuit that detects each of voltages of the plurality of cells included in each of the plurality of series cell groups; and a controlling circuit that acquires a voltage value of each of the plurality of cells from the voltage detection circuit and controls the plurality of power source circuits and the plurality of discharge circuits. The controlling circuit equalizes the states of the plurality of cells included in each of the plurality of series cell groups by using the plurality of power source circuits, and equalizes the states of the plurality of series cell groups by using the plurality of discharge circuits.

Note that any combination of the above configuration elements and the expression of the present invention converted among methods, apparatuses, systems, and the like are also effective as aspects of the present invention.

According to the present invention, in the process of equalization among a plurality of cells connected in series, it is possible to improve the power efficiency while preventing the complication of the component configuration.

DESCRIPTION OF EMBODIMENT

Figure 1:
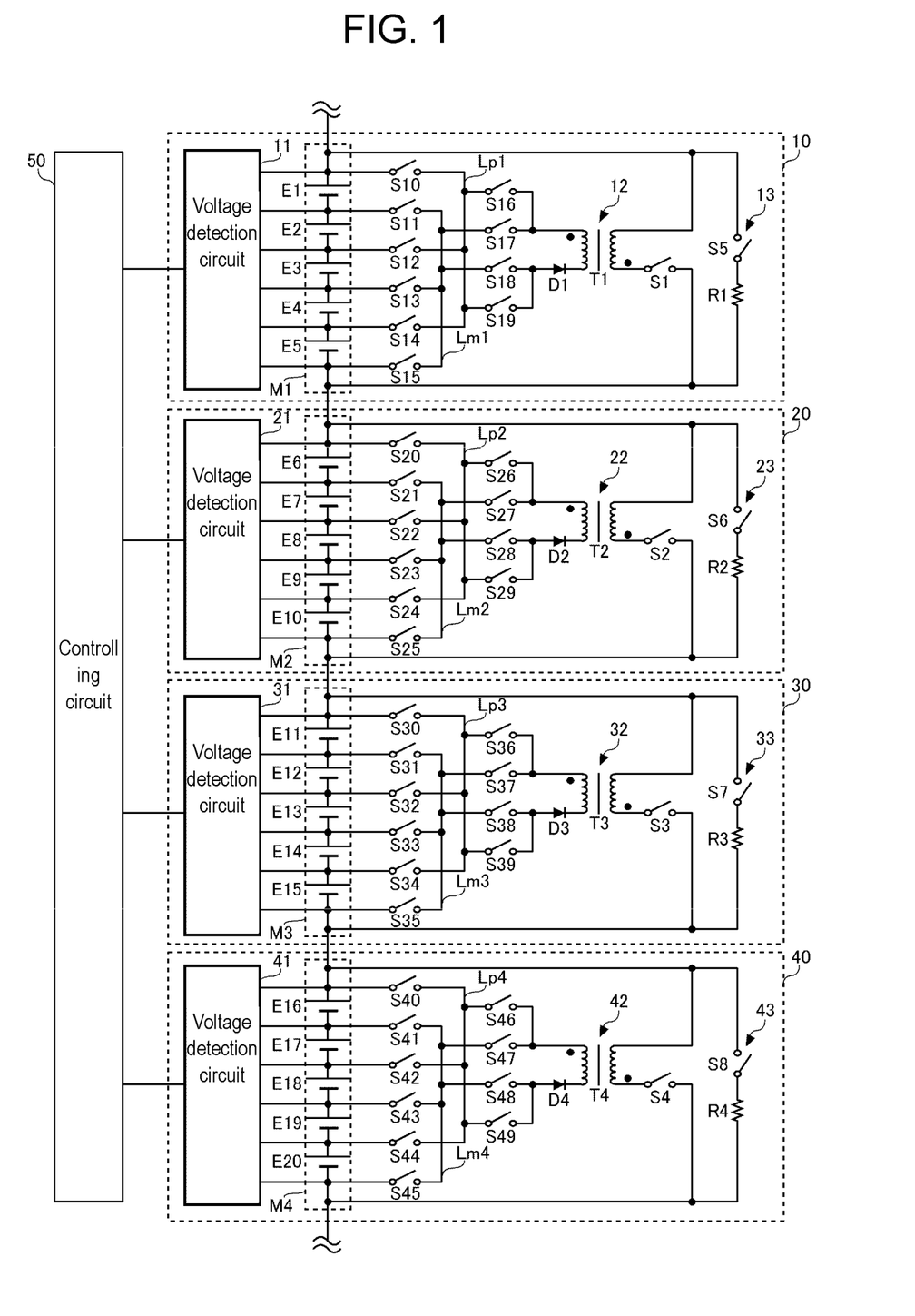
FIG. 1 is a diagram illustrating a configuration of a power supply system according to an embodiment of the present invention.

FIG. 1 is a diagram illustrating a configuration of power supply system 1 according to an embodiment of the present invention. Power supply system 1 includes a plurality of power storage stacks (in FIG. 1, first power storage stack 10 to fourth power storage stack 40) and controlling circuit 50. First power storage stack 10 includes first power storage module M1, first voltage detection circuit 11, first power source circuit 12, a plurality of switches S10 to S19, and first discharge circuit 13.

First power storage module M1 is formed by connecting a plurality of cells E1 to E5) in series. As the cell, a lithium-ion battery cell, a nickel-metal hydride battery cell, a lead battery cell, an electric double layer capacitor cell, a lithium-ion capacitor cell, or the like can be used. Hereinafter, in the present specification, an example of using a lithium-ion battery cell (nominal voltage: 3.6V to 3.7V) is assumed.

First voltage detection circuit 11 is connected to the respective nodes of the plurality of cells E1 to E5 connected in series by a plurality of voltage lines. First voltage detection circuit 11 then detects a voltage between two adjacent voltage lines to detect the voltage of each of the cells E1 to E5. First voltage detection circuit 11 is constituted by, for example, an application specific integrated circuit (ASIC). First voltage detection circuit 11 includes a multiplexer and an analog-to-digital (A/D) converter (not illustrated). The multiplexer outputs the respective voltage values of the plurality of cells E1 to E5 to the A/D converter in a predetermined order. The A/D converter converts an analog signal, input from the multiplexer, into a digital signal.

First power source circuit 12 steps down the voltage across first power storage module M1 to charge one of the plurality of cells E1 to E5. FIG. 1 illustrates an example in which first power source circuit 12 is constituted by an insulated flyback DC-to-DC (DC/DC) converter. The insulated flyback DC/DC converter includes first transformer T1, first switch S1, and first diode D1. In the insulated flyback DC/DC converter, a primary winding and a secondary winding of first transformer T1 are connected in opposite polarities. Note that first power source circuit 12 is not limited to the insulated flyback DC/DC converter, but may have any configuration so long as being an insulated power source circuit capable of stepping down a voltage across first power storage module M1 and outputting the reduced voltage. As this type of power source circuit, an insulated forward DC/DC converter and the like are known in addition to the insulated flyback DC/DC converter described above.

Both ends of the primary winding of first transformer T1 are connected to both ends of first power storage module M1. First switch S1 is inserted between one end of the primary winding and one end of first power storage module M1. First diode D1 for rectification is connected to one end of the secondary winding of first transformer T1.

The secondary winding of first transformer T1 and both ends of any of the plurality of cells E1 to E5 are connected via each of the plurality of switches S10 to S19. A voltage line is connected to the respective nodes of the plurality of cells E1 to E5. A first voltage line, a third voltage line, and a fifth voltage line are coupled by first positive electrode wiring Lp1, and a second voltage line, a fourth voltage line, and a sixth voltage line are coupled by first negative electrode wiring Lp1. Tenth switch S10 to sixteenth switch S16 are inserted into the first voltage line to the sixth voltage line, respectively.

The terminal on the current output side of the secondary winding of first transformer T1 and first positive electrode wiring Lp1 are connected via sixteenth switch S16, and the terminal on the current output side of the secondary winding and first negative electrode wiring Lm1 are connected seventeenth switch S17. The terminal on the current input side of the secondary winding of first transformer T1 and first positive electrode wiring Lp1 are connected via nineteenth switch S19, and the terminal on the current input side of the secondary winding and first negative electrode wiring Lm1 are connected via eighteenth switch S18.

First discharge circuit 13 includes fifth switch S5 and first resistor R1 connected in series. Fifth switch S5 and first resistor R1 connected in series are connected between both ends of first power storage module M1.

Configurations of second power storage stack 20, third power storage stack 30, and fourth power storage stack 40 are the same as that of the first power storage stack 10, and hence descriptions thereof will be omitted. First power storage module M1 to fourth power storage module M4 are connected in series to form one power storage unit. In the example illustrated in FIG. 1, each of power storage modules M1 to M4 includes five cells connected in series, so that a series circuit with a total of 20 cells is formed. In a case where a high voltage motor is used, a number of cells in series is increased. A series circuit with a total of 100 cells may be formed, for example, in a case where a motor requiring a high voltage (e.g., about 400V) is used. Typically, eight or more power storage modules each including five to twenty cells connected in series are connected in series to form one power storage unit. Although the present exemplary embodiment illustrates an example of the power storage module including five cells connected in series, the number of cells included in the power storage module is preferably designed in accordance with a withstand voltage of an ASIC or a power source circuit. In the present exemplary embodiment, a configuration in which the power storage unit is excluded from power supply system 1 is collectively referred to as a management device.

Controlling circuit 50 controls the whole of power supply system 1. Controlling circuit 50 is constituted by a microprocessor, for example. Controlling circuit 50 is connected to a plurality of voltage detection circuits 11 to 41 through communication lines. More specifically, controlling circuit 50 and the plurality of voltage detection circuits 11 to 41 are connected by digital communication via insulation circuits such as photocouplers. Due to the need for voltage detection circuits 11 to 41 to detect the voltages of the plurality of cells connected in series, it is necessary to increase the voltage. On the other hand, controlling circuit 50 is normally operated by being supplied with power from a lead battery of 12V. In order to absorb this voltage difference, voltage detection circuits 11 to 41 and control circuit 50 must be insulated.

Controlling circuit 50 estimates a state of charge (SOC) and a state of health (SOH) of each of the plurality of cells E1 to E20. The SOC can be estimated by, for example, an open circuit voltage (OCV) method or a current integration method. The SOH is defined as the ratio of the current full charge capacity to the initial full charge capacity, and a lower value (closer to 0%) indicates that more degradation progresses. The SOH can be estimated on the basis of the correlation with internal resistance. The internal resistance can be estimated by dividing a voltage drop, generated when a predetermined current is allowed to pass through the battery for a predetermined time, by the current. There is a relationship in which the internal resistance decreases as the temperature increases, and there is a relationship in which the internal resistance increases as the degradation of the battery progresses. The degradation of the battery progresses as a number of times of charge and discharge increases. The degradation of the battery also depends on the individual difference and use environment. Therefore, as the use period becomes longer, basically, variations in the capacities of the plurality of cells E1 to E20 increase.

Controlling circuit 50 acquires the voltage values of respective cells E1 to E20 from the plurality of voltage detection circuits 11 to 44 and performs an equalizing process. Controlling circuit 50 equalizes voltages among the plurality of cells forming one power storage module by using power source circuit 12 to 42 (active balancing). Control circuit 50 equalizes voltages among the plurality of power storage modules M1 to M4 by using discharge circuits 13 to 43 (passive balancing).

The active balancing of first power storage module M1 will be described below. In the active balancing, the capacity of the least capacity cell among the plurality of cells E1 to E5 is charged to the capacity of the most capacity cell. When the capacity of the cell with the smallest capacity reaches the capacity of the cell with the largest capacity, the same control is repeated until the capacities of all the cells match substantially.

Controlling circuit 50 acquires/estimates the OCV/SOC of the plurality of cells E1 to E5, and specifies the cell having the lowest OCV/SOC. Controlling circuit 50 controls two switches, sixteenth switch S16/seventeenth switch S17 and eighteenth switch S18/nineteenth switch S19 each inserted into two voltage lines connected to nodes at both ends of the cell, to be turned on. For example, in a case where first cell E1 is charged, tenth switch S10, eleventh switch S11, sixteenth switch S16, and eighteenth switch S18 are controlled to be turned on. In a case where second cell E2 is charged, eleventh switch S11, twelfth switch S12, seventeenth switch S17, and nineteenth switch S19 are controlled to be turned on.

Controlling circuit 50 may be configured to perform pulse width modulation (PWM) control on first switch S1. First power source circuit 12 receives the voltage across first power storage module M1, steps down the received voltage across first power storage module M1, and outputs an output voltage. When the cell is connected to the output side of first power source circuit 12, a charging current flows in accordance the voltage of the cell, and the amount of the charging current can be adjusted by performing the PWM control on first switch S1. In this way, the output of first power source circuit 12 can be adjusted by the winding ratio of the primary winding and the secondary winding of first transformer T1 and the duty ratio of first switch S1. As the charging control, various methods can be employed. As the charging control, for example, a constant-current constant-voltage system (CC-CV) is typically known, but any configuration may be adopted so long as the method can charge a target cell by using the voltage across first power storage module M1.

As described above, by repeating the control of charging the cell having the lowest OCV/SOC to the OCV/SOC of the cell with the highest OCV/SOC, controlling circuit 50 can substantially match the OCV/SOC among the plurality of cells E1 to E5. As a target value for equalization, a rechargeable amount/dischargeable amount may be used instead of OCV/SOC among the plurality of cells E1 to E5. The above active balancing is also performed in second power storage module M2 to fourth power storage module M4.

Since the active balancing described above is an energy transfer among the cells in each power storage module, the voltage across each power storage module is essentially unchanged during the active balancing. Thus, controlling circuit 50 can perform the active balancing and the passive balancing described below simultaneously in parallel.

Controlling circuit 50 estimates the OCV/SOC of each of the plurality of power storage modules M1 to M4, and specifies the power storage module having the lowest OCV/SOC. Controlling circuit 50 determines the respective discharge times for the other plurality of power storage modules in order to match the OCVs/SOCs of the other plurality of power storage modules to the power storage module having the lowest OCV/SOC. Controlling circuit 50 determines each discharge time on the basis of the discharge capacity based on the difference between the current OCV/SOC and the target OCV/SOC for equalization in each power storage module and the resistance value of each of the resistors R1-R4 for discharge. Note that the resistance values of the plurality of resistors R1 to R4 are assumed to be the same. Controlling circuit 50 controls the on/off of discharge switches S5 to S8 in the other plurality of power storage modules on the basis of the respective determined discharge times. In the power storage stack with the discharge switch in the on-state, a current flows from the power storage module to the discharge resistor, thereby lowering the OCV/SOC of the power storage module.

Controlling circuit 50 transmits a control signal for instructing the on/off of first switch S1, fifth switch S5, and tenth switch S10 to nineteenth switch S19, to first voltage detection circuit 11, transmits a control signal for instructing the on/off of second switch S2, sixth switch S6, and twentieth switch S20 to twenty-ninth switch S29, to second voltage detection circuit 21, transmits a control signal for instructing the on/off of third switch S3, seventh switch S7, and thirtieth switch S30 to thirty-ninth switch S39, to third voltage detection circuit 31, and transmits a control signal for instructing the on/off of fourth switch S4, eighth switch S8 and fortieth switch S40 to forty-ninth switch S49, to fourth voltage detection circuit 41. First voltage detection circuit 11 to fourth voltage detection circuit 41 control the on/off of switches S1 to S49 on the basis of the control signals received from controlling circuit 50.

Figure 2:
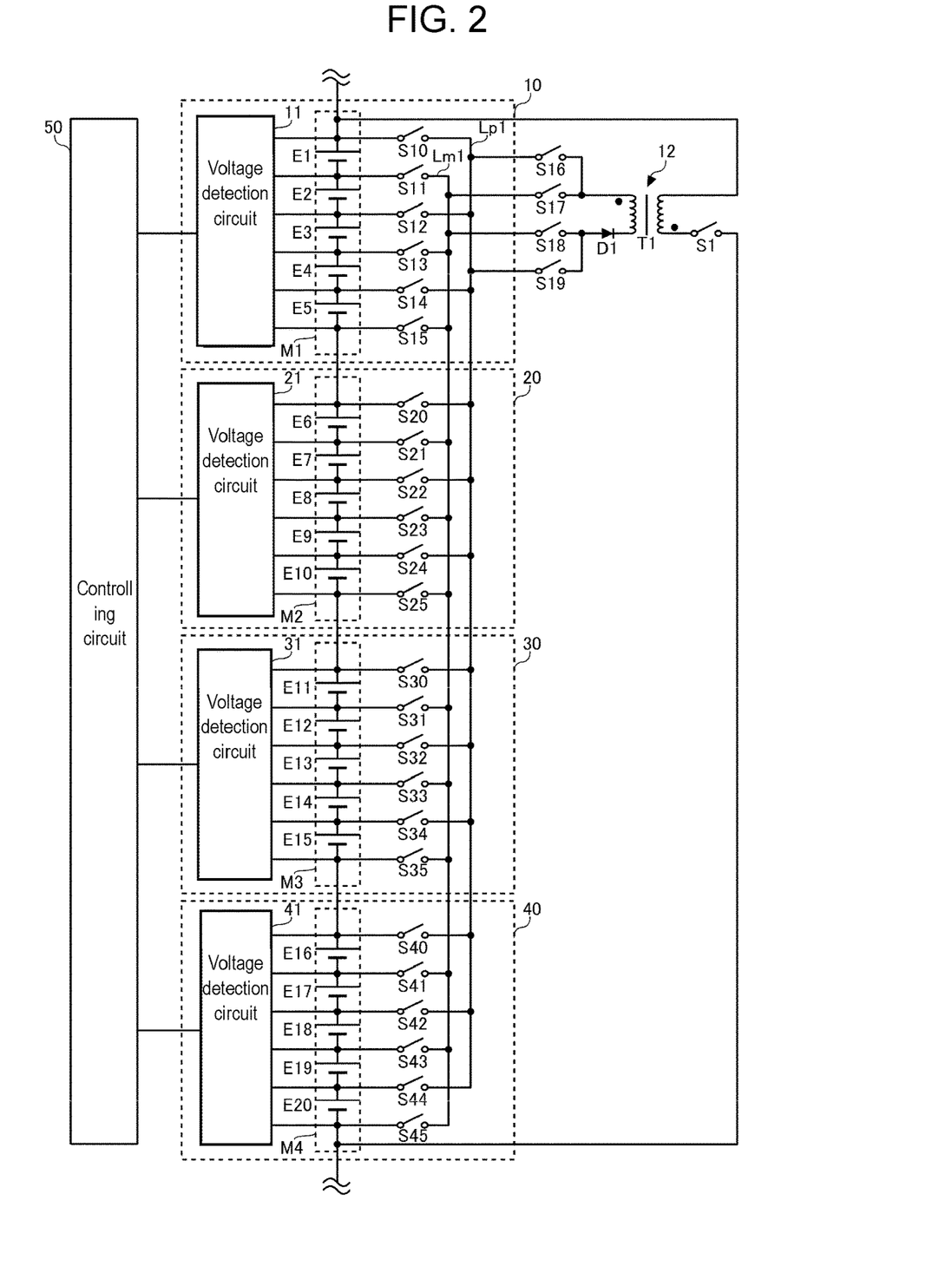
FIG. 2 is a diagram illustrating a configuration of a power supply system according to Comparative Example 1.

FIG. 2 is a diagram illustrating a configuration of power supply system 1 according to Comparative Example 1. Comparative Example 1 is an example of performing the equalizing process only by the active balancing. In Comparative Example 1, discharge circuits 13 to 43 are not provided. In Comparative Example 1, one power source circuit 12 is provided for the plurality of power storage modules M1 to M4. Odd-numbered voltage lines are connected to positive electrode wiring Lp1, and even-numbered voltage lines are connected to negative electrode wiring Lm1.

Figure 3:
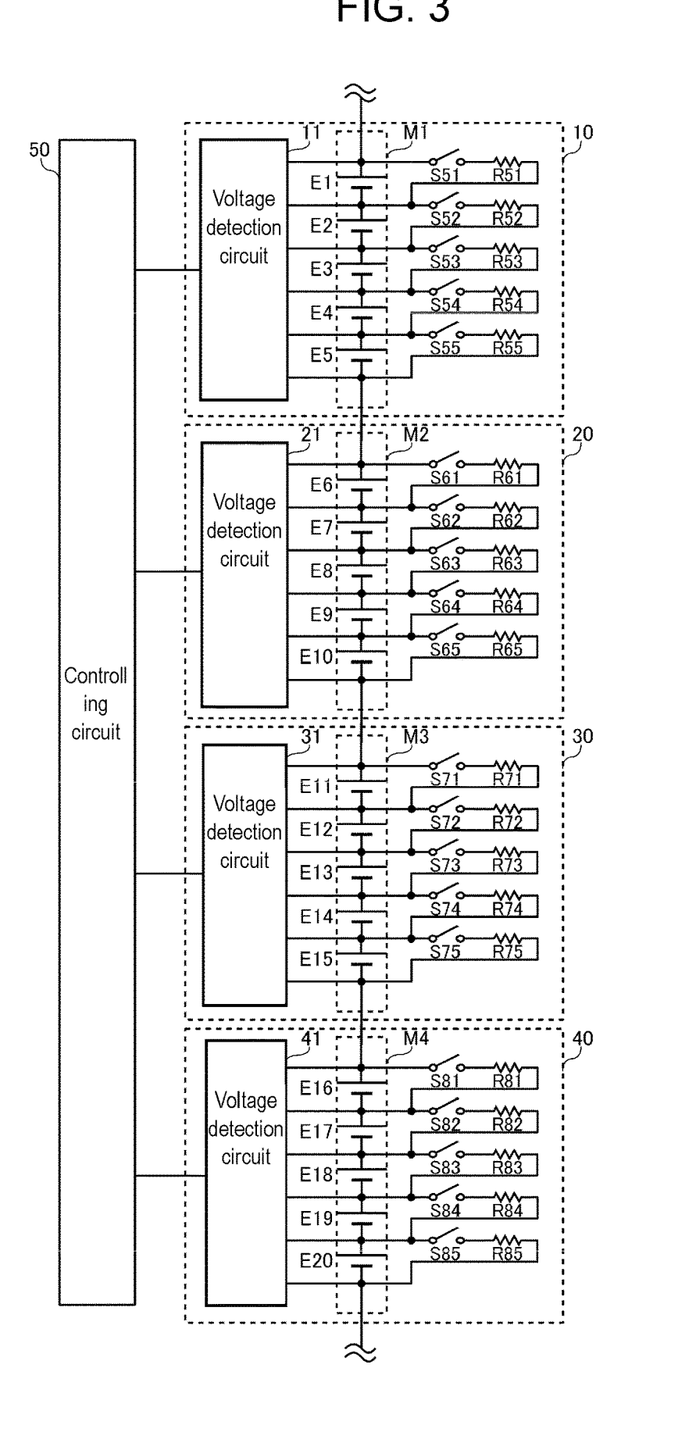
FIG. 3 is a diagram illustrating a configuration of a power supply system according to Comparative Example 2.

FIG. 3 is a diagram illustrating a configuration of power supply system 1 according to Comparative Example 2. Comparative Example 2 is an example of performing the equalizing process only by the passive balancing. In Comparative Example 2, first power source circuit 12 to fourth power source circuit 42 and tenth switch S10 to forty-ninth switch S49 are not provided. In Comparative Example 2, one discharge circuit is provided for each cell. Specifically, first discharge switch S51 and first discharge resistor R51 are connected in series to both ends of first cell E1, second discharge switch S52 and second discharge resistor R52 are connected in series to both ends of second cell E2, . . . , and twentieth discharge switch S85 and twentieth resistor R85 are connected to both ends of twentieth cell E20.

Figure 4:
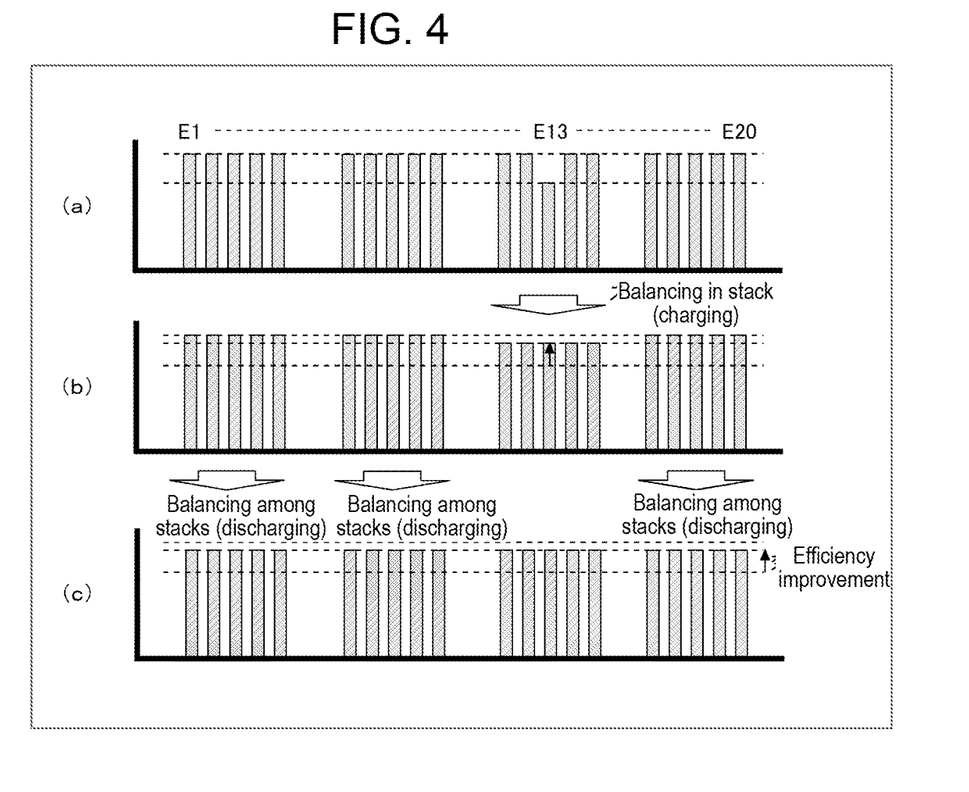
FIGS. 4(a) to 4(c) are diagrams illustrating an example of an equalizing process in the power supply system according to the embodiment of the present invention.

FIGS. 4(a) to 4(c) are diagrams illustrating an example of the equalizing process in power supply system 1 according to the exemplary embodiment of the present invention. FIG. 4(a) is a diagram illustrating the states of capacities of cells E1 to E20 before the equalizing process. In FIG. 4(a), the capacity of thirteenth cell E13 has been reduced. Due to aging degradation, individual variation, or the like, a cell with a large self-discharge amount may be generated. Thirteenth cell E13 is a cell having a larger self-discharge amount than other cells E1 to E12 and E14 to E20.

Controlling circuit 50 performs the active balancing in third power storage stack 30. Specifically, controlling circuit 50 instructs third voltage detection circuit 31 to charge thirteenth cell E13 by using third power source circuit 32. Third voltage detection circuit 31 performs the PWM control on third switch S3 by controlling thirty-second switch S32, thirty-third switch S33, thirty-sixth switch S36, and thirty-eighth switch S38 to be turned on.

FIG. 4(b) is a diagram illustrating the states of the capacities of cells E1 to E20 after completion of active cell balancing in third power storage stack 30. Since the active cell balancing has been completed in third power storage module M3, the capacities of other cells E10 to E12 and E13 to E15 in third power storage module M3 decrease with the charging of thirteenth cell E13.

Controlling circuit 50 performs the passive balancing among first power storage stack 10 and fourth power storage stack 40. Specifically, controlling circuit 50 instructs first voltage detection circuit 11, second voltage detection circuit 21, and fourth voltage detection circuit 41 to discharge the capacities of first power storage module M1, second power storage module M2, and fourth power storage module M4 to the capacity of third power storage module M3. First voltage detection circuit 21, and fourth voltage detection circuit 41 control fifth switch S5, sixth switch S6, and eighth switch S8 to be turned on, respectively, to discharge the capacities of first power storage module M1, second power storage module M2, and fourth power storage module M4.

FIG. 4(c) is a diagram illustrating the states of the capacities of cells E1 to E20 after completion of the passive balancing among first power storage stack 10 and fourth power storage stack 40. In FIG. 4(c), the capacities of all cells E1 to E20 are substantially the same. When the equalizing process using only the passive balancing illustrated in Comparative Example 2 is performed, it is necessary to discharge the capacities of other cells E1 to E12 and E14 to E20 to the capacity of thirteenth cell E13 illustrated in FIG. 4(a), which is inefficient as compared to the equalizing process according to the present exemplary embodiment.

As described above, according to the present exemplary embodiment, the active balancing is performed among the plurality of cells in each power storage stack, and the passive balancing is performed among the plurality of power storage modules among the plurality of power storage stacks. It is thereby possible to improve the power efficiency while preventing the complication of the component configuration.

In the method of performing the equalization only by the passive balancing as illustrated in Comparative Example 2, it is necessary to add the discharge resistor for each cell, and a number of components increases. Further, heat is generated when the capacity is discharged to the discharge resistor. In applications where a high voltage is required, the number of cells increases, and hence a loss due to equalizing discharge increases. In contrast, in the present exemplary embodiment, a loss due to the equalizing discharge can be reduced greatly.

On the other hand, in the method of performing the equalization only by the active balancing as illustrated in Comparative Example 1, it is necessary to generate a voltage (e.g., about 5V) for charging one cell from the total voltage (e.g., about 400V) of the power storage unit, and power source circuit 12 with a high withstand voltage is required. The use of components with the high withstand voltage increases the overall size of the circuit.

Further, due to the need for connecting all cells E1 to E20 to one power source circuit 12, the wiring is complicated. In power supply system 1 according to the present exemplary embodiment, since the active balancing is completed in one power storage stack, it is possible to mount the power source circuit and wiring between the power source circuit and the plurality of cells on a substrate in the power storage stack. Therefore, the configuration can be simplified. On the other hand, in the method of performing the equalization only by the active balancing according to Comparative Example 1, the wiring between the power source circuit and the plurality of cells needs to be placed outside the power storage stack, which complicates the wiring and increases the length of the wiring.

The present invention has been described above on the basis of the exemplary embodiment. It will be understood by the persons of ordinary skill in the art that the exemplary embodiment is illustrative, that variations can be made on a combination of each configuration element and each processing process of the exemplary embodiment, and that such variations are within the scope of the present invention.

In the above exemplary embodiment, an example in which one voltage detection circuit is mounted on one power storage stack has been described. In this regard, a configuration in which a plurality of voltage detection circuits are mounted on one power storage stack is also possible. For example, two voltage detection circuits may be mounted on a power storage stack including 20 cells connected in series, and each voltage detection circuit may detect a voltage corresponding to 10 cells. In this case, the active cell balancing is performed for each of a plurality of cells (ten in this example) managed by one voltage detection circuit. In this example, two independent active balancing operations are performed in one power storage stack.

In the above exemplary embodiment, an example in which one discharge resistor is provided for each power storage stack has been described. In this regard, a number of discharge resistors is not limited to one, and the configuration in which a discharge resistor is added for each cell is not excluded.

Note that the exemplary embodiment may be specified by the following items.

Item 1

A management device provided with: a plurality of power source circuits (12, 22, 32, 42) connected respectively to a plurality of series cell groups (M1, M2, M3, M4) each including a plurality of cells (E1 to E5, E6 to E10, E11 to E5, E16 to E20) connected in series, the plurality of power source circuits (12, 22, 32, 42) each being configured to be able to selectively charge any one of the plurality of cells (E1 to E5, E6 to E10, E11 to E5, E16 to E20) included in each of the plurality of series cell groups (M1, M2, M3, M4) by using a voltage across each of the plurality of series cell groups (M1, M2, M3, M4); a plurality of discharge circuits (13, 23, 33, 43) connected respectively to the plurality of series cell groups (M1, M2, M3, M4), the plurality of discharge circuits (13, 23, 33, 43) each being configured to be able to discharge a capacity stored in each of the plurality of series cell groups (M1, M2, M3, M4); voltage detection circuit (11, 21, 31, 41) that detects each of voltages of the plurality of cells (E1 to E5, E6 to E10, E11 to E5, E16 to E20) included in each of the plurality of series cell groups (M1, M2, M3, M4); and controlling circuit (50) that acquires a voltage value of each of the plurality of cells (E1 to E5, E6 to E10, E11 to E5, E16 to E20) from voltage detection circuit (11, 21, 31, 41) and controls the plurality of power source circuits (12, 22, 32, 42) and the plurality of discharge circuits (13, 23, 33, 43). Controlling circuit (50) equalizes states of the plurality of cells (E1 to E5, E6 to E10, E11 to E5, E16 to E20) included in series cell group (M1, M2, M3, M4) by using the plurality of power source circuits (12, 22, 32, 42), and equalizes states of the plurality of series cell groups (M1, M2, M3, M4) by using the plurality of discharge circuits (13, 23, 33, 43).

According to the above, it is possible to achieve the equalizing process that improves the power efficiency while preventing the complication of the component configuration.

Item 2

The management device according to item 1, in which discharge circuit (13, 23, 33, 43) includes: one resistor (R1, R2, R3, R4) that discharges the capacity stored in series cell group (M1, M2, M3, M4); and a switch (S5, S6, S7, S8) connected between series cell group (M1, M2, M3, M4) and one resistor (R1, R2, R3, R4).

According to the above, numbers of resistors for discharge and switches can be reduced.

Item 3

The management device according to item 1 or 2, in which controlling circuit (50) performs a process of equalization among the plurality of cells (E1 to E5, E6 to E10, E11 to E15, E16 to E20) forming series cell group (M1, M2, M3, M4) and a process of equalization among the plurality of series cell groups (M1, M2, M3, M4) in parallel.

According to the above, the time required for the equalizing process can be shortened.

Item 4

A power supply system (1) provided with: a power storage unit in which the plurality of series cell groups (M1, M2, M3, M4) are connected in series; and the management device according to any one of items 1 to 3 that manages the power storage unit.

According to the above, it is possible to achieve the equalizing process that improves the power efficiency while preventing the complication of the component configuration.

The invention claimed is:

1. A management device comprising:
a plurality of insulated power source circuits connected respectively to a plurality of series cell groups each including a plurality of cells connected in series, the plurality of insulated power source circuits each being configured to be able to selectively charge any one of the plurality of cells included in each of the plurality of series cell groups by stepping down a voltage across each of the plurality of series cell groups so as to output a reduced voltage to said any one of the plurality of cells;
a plurality of discharge circuits connected respectively to the plurality of series cell groups, the plurality of discharge circuits each being configured to be able to discharge a capacity stored in each of the plurality of series cell groups;
a voltage detection circuit that detects each of voltages of the plurality of cells included in each of the plurality of series cell groups; and
a controlling circuit that acquires a voltage value of each of the plurality of cells from the voltage detection circuit and controls the plurality of power source circuits and the plurality of discharge circuits,
wherein the controlling circuit equalizes states of the plurality of cells included in each of the plurality of series cell groups by using the plurality of power source circuits, and equalizes states of the plurality of series cell groups by using the plurality of discharge circuits.

2. The management device according to claim 1, wherein each of the plurality of discharge circuits includes one resistor that discharges a capacity stored in each of the plurality of series cell groups, and a switch connected between each of the plurality of series cell groups and the one resistor.

3. The management device according to claim 1, wherein the controlling circuit performs, a process of equalization among the plurality of cells forming the plurality of series cell groups, and a process of equalization among the plurality of series cell groups, in parallel.

4. A power supply system comprising:
a power storage unit in which the plurality of series cell groups are connected in series; and
the management device according to claim 1 that manages the power storage unit.

* * * * *